(12) United States Patent
Van Deursen et al.

(10) Patent No.: US 7,342,360 B2
(45) Date of Patent: Mar. 11, 2008

(54) FLASHLIGHT

(75) Inventors: Gary Van Deursen, Avon, CT (US);
Michael Kwok Ying Chan, N.T. (HK)

(73) Assignee: The Stanley Works, New Britain, CT (US)

( * ) Notice: Subject to any disclaimer, the term of this patent is extended or adjusted under 35 U.S.C. 154(b) by 50 days.

(21) Appl. No.: 10/968,266

(22) Filed: Oct. 20, 2004

(65) Prior Publication Data

US 2006/0082321 A1    Apr. 20, 2006

(51) Int. Cl.
*H05B 37/00* (2006.01)
*H05B 41/14* (2006.01)

(52) U.S. Cl. ........................... 315/86; 315/87; 362/189; 362/194; 362/195; 362/208; 429/1; 429/9

(58) Field of Classification Search ........ 362/194–208, 362/189; 315/86, 87; 429/1, 9
See application file for complete search history.

(56) References Cited

U.S. PATENT DOCUMENTS

| | | | |
|---|---|---|---|
| 2,726,321 A | 12/1955 | Riotto | 362/184 |
| 4,092,580 A * | 5/1978 | Prinsze | 320/115 |
| 4,208,703 A | 6/1980 | Orr | |
| 4,648,697 A | 3/1987 | Kawazoe | |
| 4,739,457 A | 4/1988 | Orr | |
| 4,770,954 A * | 9/1988 | Noordenbos | 429/9 |
| 4,819,141 A | 4/1989 | Maglica et al. | 362/207 |
| 4,907,769 A | 3/1990 | Hunley, Jr. et al. | 248/185 |
| 5,008,785 A * | 4/1991 | Maglica et al. | 362/183 |
| 5,142,467 A | 8/1992 | Yuen | 362/399 |
| 5,384,609 A | 1/1995 | Ogawa et al. | |
| 5,496,654 A * | 3/1996 | Perkins | 429/1 |
| 5,541,822 A | 7/1996 | Bamber | 362/190 |
| 5,592,066 A | 1/1997 | Fan | |
| 5,595,436 A | 1/1997 | Way, Jr. et al. | 362/190 |
| 5,630,660 A | 5/1997 | Chen | 362/183 |

(Continued)

FOREIGN PATENT DOCUMENTS

BE    620644 A    11/1962

(Continued)

OTHER PUBLICATIONS

European Search Report dated Aug. 13, 2007 for related application EP 05 25 6295.

*Primary Examiner*—Don Wong
*Assistant Examiner*—Marie Antoinette Cabucos
(74) *Attorney, Agent, or Firm*—Pillsbury Winthrop Shaw Pittman LLP

(57) ABSTRACT

A handheld flashlight includes a head that pivots relative to a body. Three legs pivotally connect to the body and open into a tripod to support the head in an elevated position. The legs are spring-biased toward the open tripod position and are selectively held closed by a detent mechanism. In the closed position, the legs form a flashlight handle that is aligned with an illumination direction of the head and is shaped and sized to be held in the hand of an operator. Each of the three legs contain battery source holders for battery sources that connect to each other in parallel. Diodes are disposed in series with each battery source to prevent the parallel battery sources from discharging each other.

21 Claims, 7 Drawing Sheets

U.S. PATENT DOCUMENTS

| | | | |
|---|---|---|---|
| 5,684,452 A | 11/1997 | Wang | 340/321 |
| 5,690,418 A | 11/1997 | Hsiung | 362/259 |
| 5,816,684 A | 10/1998 | Yu | 362/191 |
| 5,931,560 A | 8/1999 | Hoffman | 362/124 |
| 5,934,628 A | 8/1999 | Bosnakovic | |
| 6,012,824 A | 1/2000 | Sharrah et al. | 362/199 |
| 6,091,358 A | 7/2000 | Maniscalco | |
| 6,181,067 B1 | 1/2001 | Dalton | 315/86 |
| 6,265,969 B1 | 7/2001 | Shih | |
| 6,318,878 B1 * | 11/2001 | Dorfman | 362/189 |
| 6,394,631 B1 | 5/2002 | Yuen | 340/908 |
| 6,454,228 B1 | 9/2002 | Bosnakovic | |
| 6,469,619 B1 | 10/2002 | Mayercheck | |
| 6,517,215 B2 * | 2/2003 | Mele | 362/203 |
| 6,572,061 B2 | 6/2003 | Overbeck | |
| 6,583,523 B1 * | 6/2003 | Bhate | 307/86 |
| 6,851,828 B1 * | 2/2005 | Hansen | 362/203 |
| 6,873,249 B2 | 3/2005 | Chu | |
| 7,011,423 B2 | 3/2006 | Chen | |
| 2001/0020903 A1 | 9/2001 | Wang | 362/399 |
| 2002/0136005 A1 | 9/2002 | Lee | 362/171 |
| 2003/0067771 A1 | 4/2003 | Kung | 362/191 |
| 2004/0124997 A1 | 7/2004 | Chu | |
| 2004/0228133 A1 | 11/2004 | Tsao | |
| 2005/0030737 A1 | 2/2005 | Chen | |

FOREIGN PATENT DOCUMENTS

| | | |
|---|---|---|
| CH | 608661 A5 | 1/1979 |
| DE | 203 00 078 U1 | 5/2003 |

* cited by examiner

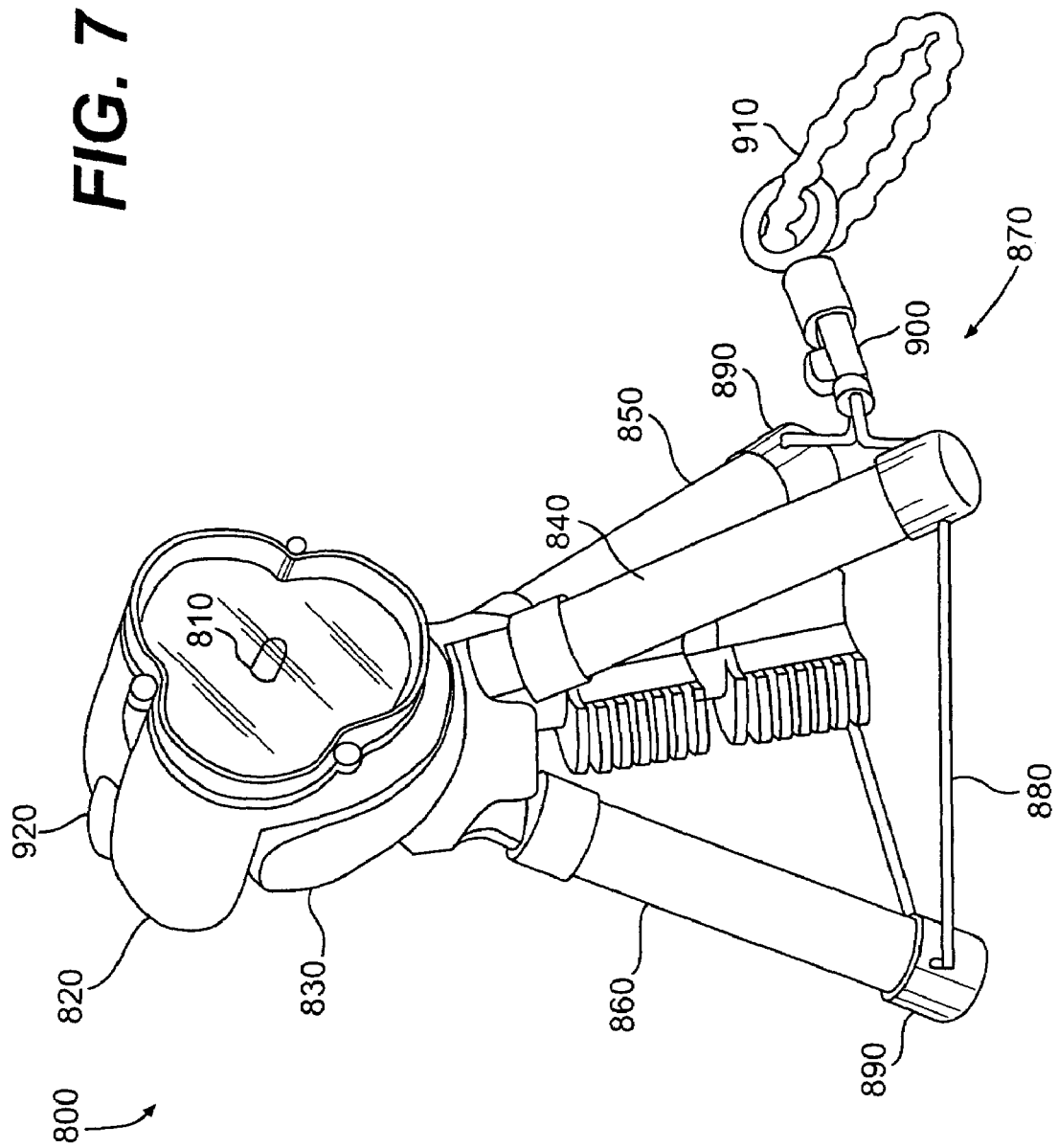

FLASHLIGHT

BACKGROUND OF THE INVENTION

1. Field of the Invention

This invention relates to handheld flashlights and particularly relates to flashlights that can be disposed in an upright, self-supporting position. This invention also relates to flashlights that utilize battery sources disposed in parallel.

2. Description of Related Art

Connecting flashlight batteries in parallel rather than series circuits has the potential to extend the flashlight's battery life. However, conventional flashlights typically do not utilize such parallel circuits because batteries arranged in parallel tend to charge/discharge each other, which significantly reduces the flashlight's battery life. To combat the disadvantageous discharge, U.S. Pat. No. 6,181,067 discloses a flashlight that utilizes switches disposed in series with each of the parallel batteries. When the switches are opened, the batteries become electrically isolated from each other such that they do not discharge each other. Closing the switches electrically connects the batteries to the flashlight's light source in parallel. Such a flashlight requires extra parts. Moreover, the parallel batteries still discharge each other whenever the flashlight is on because the parallel batteries become electrically connected to each other.

It is known to provide mechanisms that hold flashlight in self-supporting upright positions to free an operator's hands. For example, U.S. Pat. No. 5,541,822 discloses a flashlight with a support clip to hold the flashlight in an upright position. Unfortunately, since the clip is small relative to the flashlight, the clip cannot stably support the flashlight. U.S. Pat. No. 5,684,452 discloses a flashlight with legs that expand into a tripod position to support the flashlight in an upright position. Unfortunately, the legs make the flashlight cumbersome and bulky. Other known mechanisms for holding a flashlight in a self-supporting upright position are bulky, complex, and render the flashlight cumbersome to operate.

SUMMARY OF THE INVENTION

Accordingly, one aspect of one or more embodiments of this invention provides a flashlight with parallel battery sources that do not discharge each other even when the flashlight is on.

Another aspect of one or more embodiments of the present invention provides a compact handheld flashlight with legs that expand into a stable tripod to support the flashlight's head in an elevated position. After the operator appropriately positions the flashlight head, the operator's hands are free.

Another aspect of one or more embodiments of the present invention provides a flashlight that includes a light source and a plurality of battery sources electrically connected to the light source in parallel. The flashlight also includes a plurality of diodes. Each of the plurality of diodes are disposed in series with a corresponding one of the plurality of battery sources to discourage electricity from flowing from one of the battery sources to another of the battery sources. The flashlight may also include an on/off switch electrically disposed between the plurality of battery sources and the light source. Each battery source may include a plurality of batteries arranged in series with each other.

According to a further aspect of one or more of these embodiments, any complete electrical path between any two of the battery sources comprises two oppositely biased diodes in series with each other.

Another aspect of one or more embodiments of the present invention provides a flashlight that includes a housing defining a plurality of battery source holders and a light source mounted to the housing. The flashlight further includes an electrical circuit connecting the battery source holders to the light source in parallel. The flashlight also includes a plurality of diodes. Each of the plurality of diodes are disposed in series with a corresponding one of the plurality of battery source holders.

According to a further aspect of one or more of these embodiments, the electrical circuit further includes a switch having closed and open positions, wherein the battery source holders are electrically connected to the light source when the switch is closed, and the battery source holders are electrically disconnected from the light source when the switch is in the open position. The battery source holders may remain in a closed parallel circuit with each other regardless of the position of the switch.

Another aspect of one or more embodiments of the present invention provides a handheld flashlight that has a head including a light source. The flashlight also has first, second, and third legs connected to the head. At least two of the legs are pivotally movable between closed and open positions. The first, second, and third legs are positioned to support the head in an elevated position when the at least two of the legs are in their open positions. The flashlight also includes first and second battery source holders disposed within the first and second legs, respectively. The battery source holders are adapted to electrically connect to the light source.

According to a further aspect of one or more of these embodiments, the at least two of the legs comprises the first, second, and third legs. The flashlight may also include a third battery source holder disposed on the third leg and adapted to electrically connect to the light source. The first, second, and third legs preferably form a tripod when the at least two of the legs are in their open positions.

According to a further aspect of one or more of these embodiments, the first and second legs each include a tube constructed to hold a battery source therein.

According to a further aspect of one or more of these embodiments, the first, second, and third legs are generally parallel to each other when the at least two of the legs are in the closed position.

According to a further aspect of one or more of these embodiments, the first, second, and third legs together form a longitudinally elongated flashlight handle when the at least two of the legs are in the closed position. The flashlight handle defines a longitudinal axis. The head defines an illumination direction that is generally parallel to the longitudinal axis of the flashlight handle.

According to a further aspect of one or more of these embodiments, the flashlight includes a body portion connected to the head. The at least two of the legs pivotally connect to the head via pivotal connections between the legs and the body portion. The body portion may define a longitudinally extending flashlight axis, such that the first, second, and third legs are generally parallel to the flashlight axis when the at least two of the legs are in the closed position. The head defines an illumination direction and movably connects to the body portion to permit an operator to selectively redirect the illumination direction relative to the body portion.

According to a further aspect of one or more of these embodiments, the movable connection between the head and body is a pivotal connection that defines a head pivot axis that is generally perpendicular to the illumination direction. According to a further aspect of one or more of these embodiments, the head and body portions include mating frictional surface features that resist pivotal movement of the head relative to the body portion about the head pivot axis.

According to a further aspect of one or more of these embodiments, the at least two of the legs are spring-biased toward their open positions.

According to a further aspect of one or more of these embodiments, the flashlight further includes an operator-releasable detent mechanism/lock that releasably holds the at least two of the legs in their closed positions.

According to a further aspect of one or more of these embodiments, the at least two of the legs are mechanically linked to each other so as to force the at least two of the legs to move between their open and closed positions in unison. Each of the at least two of the legs may include gear teeth disposed thereon. The gear teeth operatively connect to one another to force the at least two of the legs to pivot in unison relative to the head.

According to a further aspect of one or more of these embodiments, the flashlight includes a body portion connected to the head. The at least two of the legs pivotally connect to the head via a pivotal connection between the legs and the body portion. The flashlight includes a rack mounted to the body to allow the rack to move longitudinally relative to the body. The rack has a plurality of spaced teeth. The teeth of the rack mesh with the gear teeth of the at least two of the legs such that the gear teeth of the at least two of the legs operatively connect to each other via the rack. The rack moves longitudinally when the at least two of the legs move between their open and closed positions. According to a further aspect of one or more of these embodiments, a spring operatively extends between the body portion and the rack to bias the rack in a longitudinal direction that moves the at least two of the legs into their open positions.

Another aspect of one or more embodiments of the present invention provides a keychain that includes a flashlight. The flashlight includes a head with a light source. The flashlight also includes first, second, and third legs connected to the head. At least two of the legs are pivotally movable between closed and open positions. The first, second, and third legs are positioned to support the head in an elevated position when the at least two of the legs are in their open positions. The keychain also includes a key ring connected to the flashlight.

Another aspect of one or more embodiments of the present invention provides a flashlight that includes a head including a light source. The flashlight also includes first, second, and third legs connected to the head. At least two of the legs are pivotally movable between closed and open positions and spring-biased toward their open positions. The first, second, and third legs are positioned to support the head in an elevated position when the at least two of the legs are in their open positions. The flashlight also includes an operator-releasable lock that releasably holds the at least two of the legs in their closed positions.

Another aspect of one or more embodiments of the present invention provides a flashlight that includes a head with a light source. The flashlight also includes first, second, and third legs connected to the head and pivotally movable relative to the head between closed and open positions. The first, second, and third legs are positioned to support the head in an elevated position when in their open positions. The flashlight also includes an operator-releasable lock that releasably holds the first, second, and third legs in their closed positions. The lock remains physically mounted to the flashlight regardless of the pivotal position of the legs.

According to a further aspect of one or more of these embodiments, the lock includes a flexible cord operatively extending between the first, second, and third legs. The lock also includes an adjustable clasp connected to the cord. Selective adjustment of the clasp varies a length of the cord on one side of the clasp to selectively limit an extent to which the legs may pivot toward their open positions.

According to a further aspect of one or more of these embodiments, the lock includes magnetic material mounted to one of the head and the first, second, or third legs. The lock also includes a ferromagnetic material mounted to the other of the head and the first, second, or third legs. The ferromagnetic material is aligned with the magnetic material when the legs are in their closed positions to magnetically secure the legs in their closed positions.

According to a further aspect of one or more of these embodiments, the lock further includes a switch that selectively moves the magnetic material and the ferromagnetic material out of alignment with each other to allow the legs to move into their open positions.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which from a part of this original disclosure:

FIG. 7 is a side perspective view of a flashlight according to an alternative embodiment of the present invention.

DETAILED DESCRIPTION OF PREFERRED EMBODIMENTS

Figure 1:
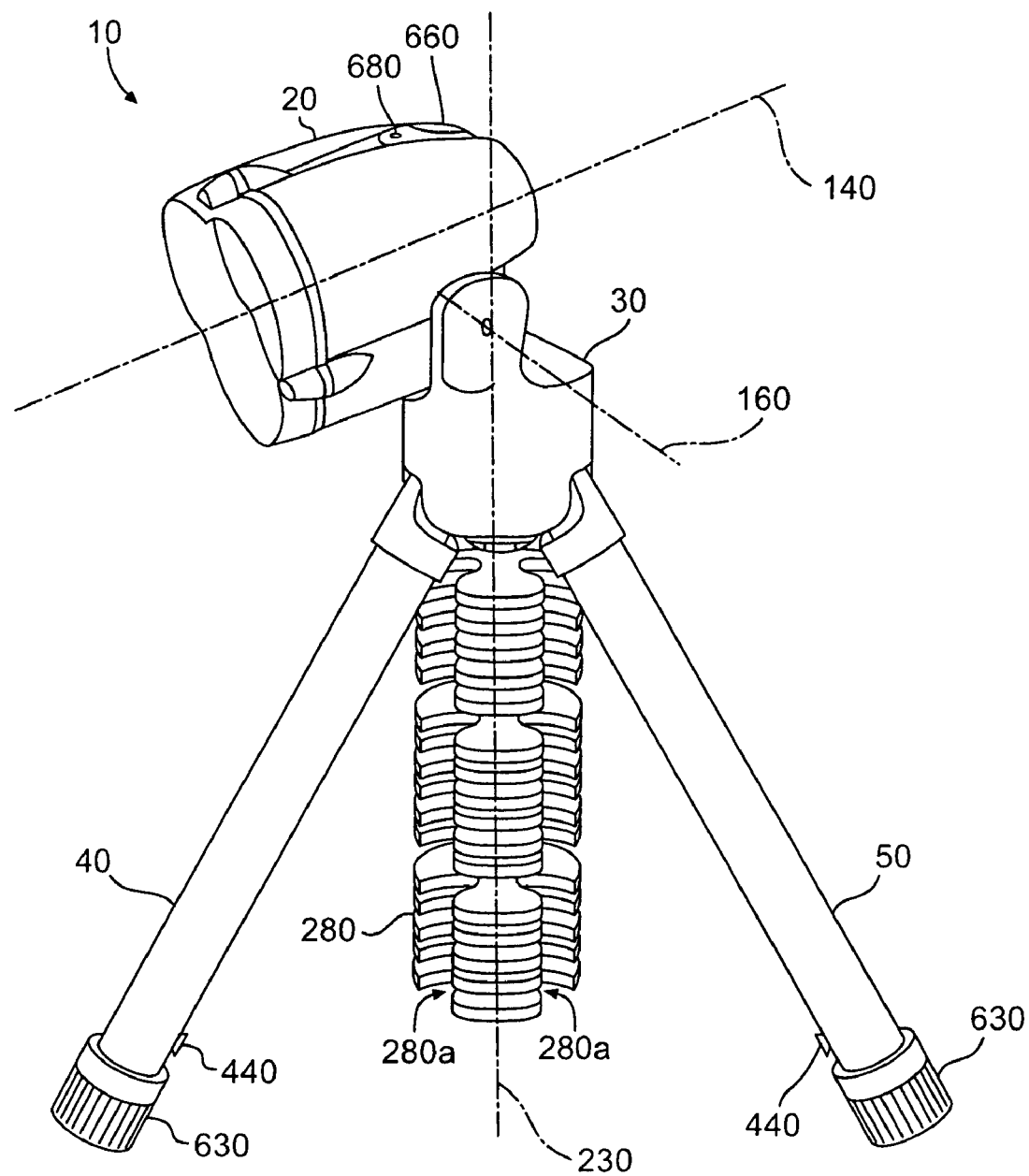
FIG. 1 is side perspective view of a flashlight in an open tripod position according to an embodiment of the present invention.

FIGS. 1-4 illustrate a hand-held flashlight 10 according to one embodiment of the present invention. As shown in FIG. 1, the flashlight 10 comprises a head 20, a body portion 30, and three legs 40, 50, 60.

Figure 3:
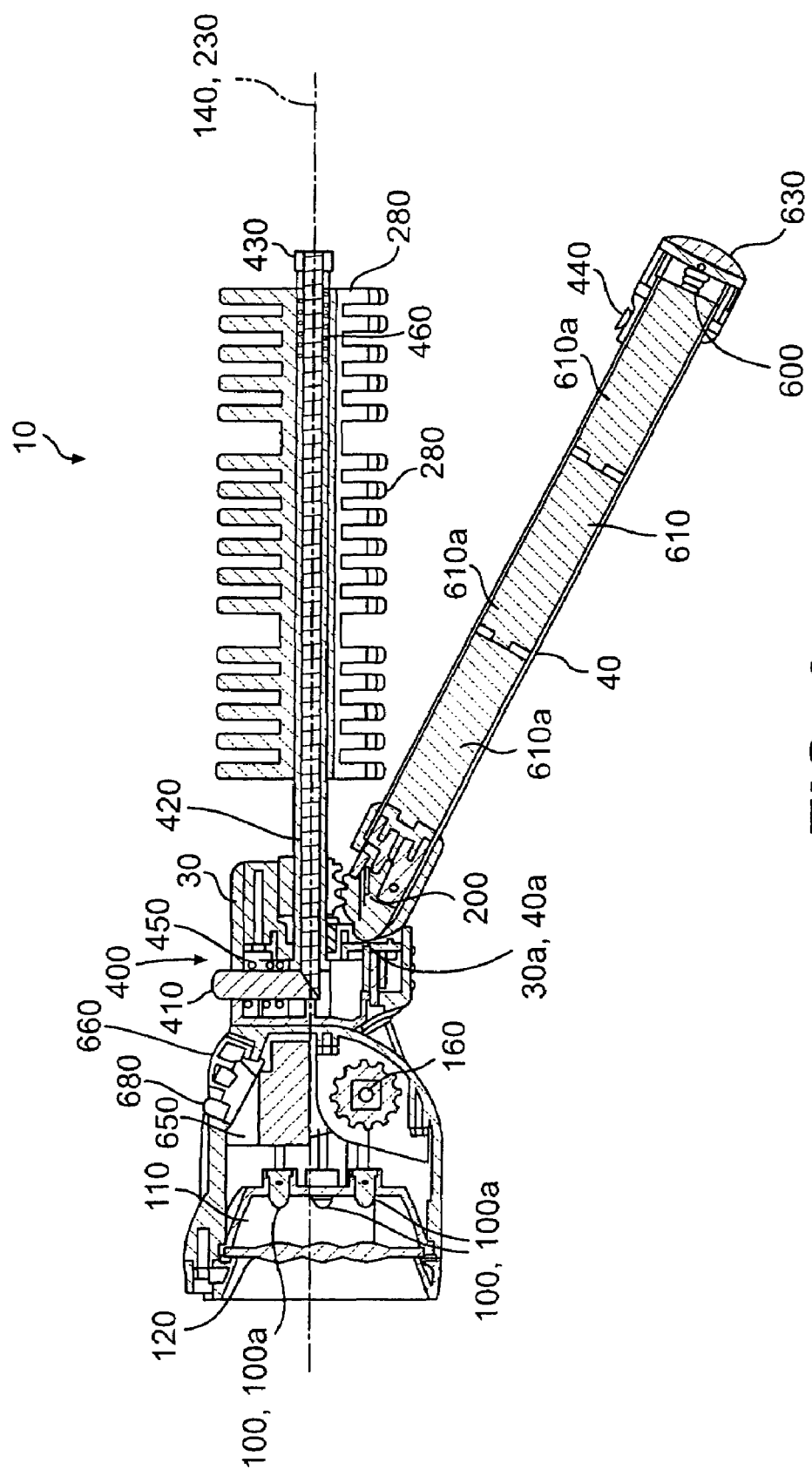
FIG. 3 is cross-sectional view of the flashlight in FIG. 2, taken along the line 3-3 in FIG. 2, but with a flashlight leg in an open position.

As shown in FIG. 3, the head 20 includes a light source 100, a reflector well 110, and a clear cover 120. The illustrated light source 100 includes a plurality of light emitting diodes (LEDs) 100*a*, but may alternatively comprise any other suitable light(s) (e.g., halogen, incandescent, florescent, etc.). The reflector well 110 is a multi-lobe reflector well. The clear cover 120 includes a plurality of discrete lenses formed therein, one for each of the LEDs 100*a*. The head 20 and light source 100 define an illumination direction 140 along which light generated by the light source 100 generally projects.

Figure 4:
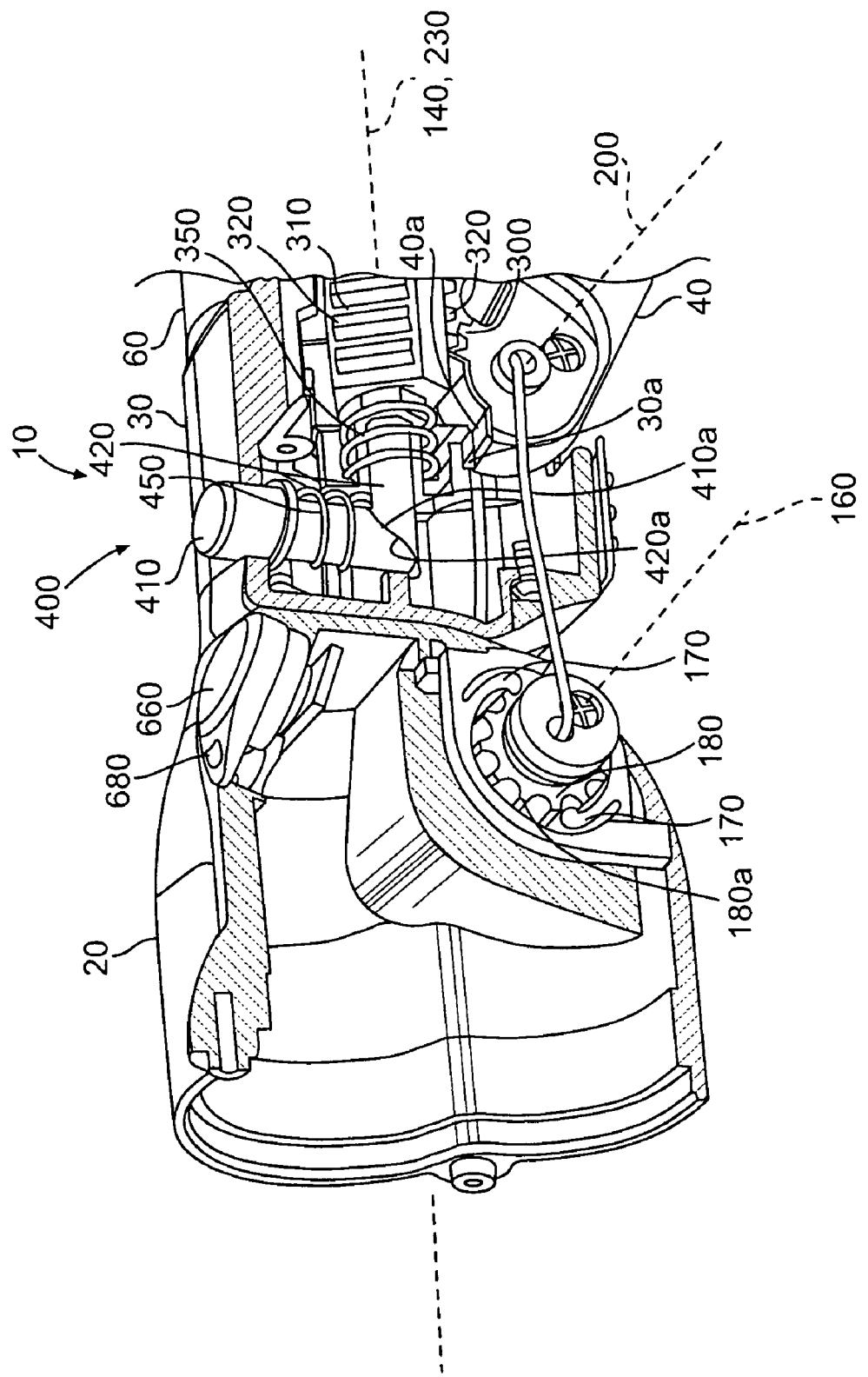
FIG. 4 is a partially cut away perspective view of the flashlight in FIG. 1.

As best illustrated in FIG. 4, the head 20 pivotally connects to the body portion 30 for relative pivotal movement about a head pivot axis 160 that is generally perpendicular to the illumination direction 140. While the illustrated movable connection between the head 20 and body portion 30 comprises a pivotal connection, the movable connection may alternatively comprise any other suitable movable connection that allows an operator to adjust or redirect the illumination direction relative to the body portion 30 without deviating from the scope of the present invention.

As best illustrated in FIG. 4, the head 20 includes a frictional surface feature 170 that mates with a corresponding frictional surface feature 180 disposed on the body portion 30 to resist pivotal movement of the head 20 relative to the body portion 30 about the head pivot axis 160. The illustrated surface feature 170 comprises two resiliently deformable paws disposed on the head 20. The illustrated surface feature 180 comprises a spur gear with teeth 180a that mate with the paws 170. To pivot the head 20, an operator must apply sufficient pivoting force to overcome the frictional resistance between the paws 170 and toothed spur gear 180. Each tooth 180a provides a positive pivotal position for the head 20 such that the head 20 pivots in finite intervals. Interaction between the paws 170 and the teeth 180a may provide a satisfying clicking sound as the paws jump between adjacent teeth 180a.

While the illustrated surface features 170, 180 comprise paws and teeth 180a, any other suitable frictionally engageable surface features may alternatively be used. For example, the surface features 170, 180 may comprise mating flat high-friction surfaces such as rubber.

Figure 2:
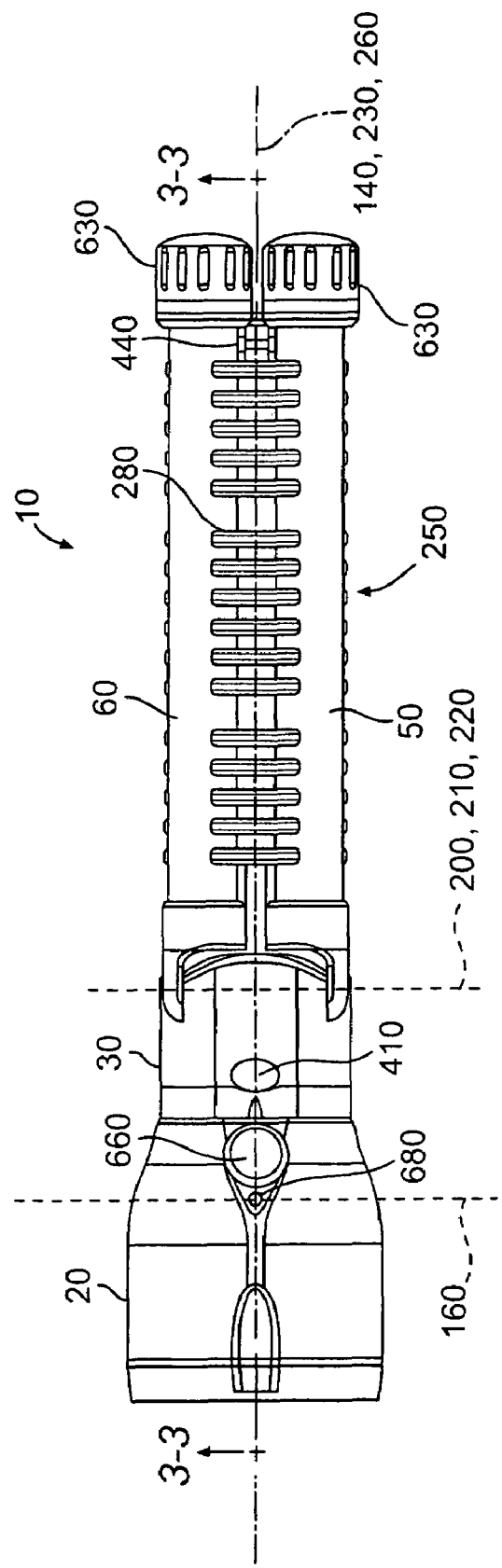
FIG. 2 is a top view of the flashlight of FIG. 1.

As shown in FIGS. 2-4, the legs 40, 50, 60 pivotally connect to the body portion 30 for relative pivotal movement about leg axes 200, 210, 220, respectively. The leg axes 200, 210, 220 are each generally perpendicular to a longitudinal flashlight axis 230 defined by the body portion 30. The legs 40, 50, 60 pivot relative to the body portion 30 between open positions (see FIG. 1) and closed positions (see FIG. 2). As shown in FIGS. 3 and 4, physical interference between abutting surfaces 30a and 40a of the body portion 30 and the legs 40, 50, 60, respectively prevent the legs 40, 50, 60 from pivoting beyond their open positions.

As shown in FIG. 1, the legs 40, 50, 60 form a tripod to support the head 20 in an elevated position when the legs 40, 50, 60 are in their open positions. An operator may rest the opened flashlight 10 on a relatively flat surface and pivot the head 20 about the head pivot axis 160 to aim the head 20 in a variety of desired directions (e.g., horizontally, upwardly, downwardly, etc.). As shown in FIGS. 1 and 3, the pivotal range of the head 20 relative to the body portion 30 is preferably greater than 90 degrees so that the head 20 can aim the illumination direction 140 downwardly toward the ground.

As shown in FIG. 2, when the legs 40, 50, 60 are in their closed positions, they form a longitudinally elongated flashlight handle 250 that defines a flashlight handle axis 260 that is parallel to, and preferably concentric with the longitudinal flashlight axis 230. The flashlight handle 250 is shaped and sized to be held by a hand of the operator as in conventional flashlights. When the flashlight 10 is used like a conventionally shaped flashlight, the head 20 may be pivoted about the head pivot axis 160 such that the illumination direction 140 is generally parallel to the flashlight handle axis 260. When the legs 40, 50, 60 are in their closed positions, the legs 40, 50, 60 are preferably parallel to each other, the longitudinal flashlight axis 230, and the flashlight handle axis 260. The legs 40, 50, 60 are disposed adjacent to each other so that the overall flashlight handle 250 has an outer diameter that is small enough to allow an operator to comfortably grip it with one hand.

As shown in FIGS. 1-3, the body portion 30 includes a longitudinally elongated, rearwardly extending grip 280. The legs 40, 50, 60 abut openings 280a in the grip 280 when the legs 40, 50, 60 move into their closed positions. The grip 280 extends radially outwardly beyond the legs 40, 50, 60 to provide a gripping surface for the operator to hold on to. The openings 280a preferably support the closed legs 40, 50, 60 against torsional movement and excessive inward pivotal movement. The grip 280 may be omitted without deviating from the scope of the present invention.

The legs 40, 50, 60 are equally spaced around the circumference of the body portion 30 (e.g., being spaced by 120 degrees from each other around the body portion 30), but may alternatively be asymmetrically spaced without deviating from the scope of the present invention.

In the illustrated embodiment, the legs 40, 50, 60 pivotally connect to the head 20 via the pivotal connections between the legs 40, 50, 60 and the body portion 30. Alternatively, the legs 40, 50, 60 may directly pivotally connect to the head 20 without deviating from the scope of the present invention.

In the illustrated embodiment, all three legs 40, 50, 60 pivotally connect to the body portion 30. Alternatively, one of the legs 40, 50, 60, the leg 40, for example, may be rigidly connected to or integrally formed with the body portion 30 such that only the other two legs 50, 60 pivotally connect to the body portion 30. In such an embodiment, opening the two legs 50, 60 would nonetheless position the three legs 40, 50, 60 in a tripod. The body portion 30, however, would be skewed relative to a vertical direction of the resulting tripod.

While the illustrated flashlight 10 includes three legs 40, 50, 60, additional leg(s) may be added without deviating from the scope of the present invention.

As shown in FIG. 4, the legs 40, 50, 60 are mechanically linked to one another so as to force them to open and close in unison. Each of the legs 40, 50, 60 includes a plurality of gear teeth 300 that are circumferentially spaced around the leg pivot axes 200, 210, 220, respectively. A toothed rack 310 movably connects to the body portion 30 to allow relative axial movement along the flashlight axis 230. The rack 310 includes a plurality of axially spaced teeth 320 that mesh with the gear teeth 300 of the legs 40, 50, 60 such that the gear teeth 300 operatively connect to each other via the rack 310. Consequently, the rack 310 moves axially when the legs 40, 50, 60 move between their open and closed positions. The rack 310 therefore forces the legs 40, 50, 60 to move between their open and closed positions in unison.

While the illustrated teeth 300, 320 are square, the teeth 300, 320 may alternatively comprise any other suitable mating surface features (e.g., spiral teeth, mating protrusions and extrusions, etc.) without deviating from the scope of the present invention.

While the rack 310 is used to operatively connect the legs 40, 50, 60, the legs 40, 50, 60 may alternatively include teeth that directly mesh with each other to force the legs 40, 50, 60 to pivot in unison with each other. Moreover, any other suitable mechanical link may be used to force the legs 40, 50, 60 to pivot in unison with each other. While synchronous movement of the legs 40, 50, 60 is preferred, the mechanical link may nonetheless be omitted entirely such that the legs 40, 50, 60 pivot independently without deviating from the scope of the present invention.

As shown in FIG. 4, a compression spring 350 operatively extends between the body portion 30 and the rack 310 to bias the rack 310 in a rearward axial direction that moves the legs 40, 50, 60 toward their open positions. Consequently, the legs 40, 50, 60 are spring-biased toward their open positions. While the illustrated spring 350 is a compression spring, the spring 350 may alternatively comprise any other suitable spring (e.g., tension spring, torsion spring, rubber band, rubber element, etc.) without deviating from the scope of the present invention. While the rack 310 and spring 350 are used to spring bias the legs 40, 50, 60 in the illustrated flashlight 10, the legs 40, 50, 60 may alternatively be spring biased using any other suitable mechanism (e.g., torsional springs disposed between the legs 40, 50, 60 and the body portion 30 at the leg pivot axes 200, 210, 220, resilient rubber element(s) such as a rubber bands disposed between the legs 40, 50, 60 and the body portion 30).

As shown in FIGS. 3 and 4, the flashlight 10 also includes an operator-releasable detent/lock mechanism 400 that selectively holds the legs 40, 50, 60 in their closed positions. The detent mechanism 400 includes a spring-loaded activation button 410, a longitudinally elongated activation rod 420, a magnet 430 (see FIGS. 2 and 3), and metallic objects 440 (see FIGS. 1-3).

As shown in FIG. 4, the activation button 410 is slidably mounted to the body portion 30 for relative vertical movement (as viewed in FIGS. 3 and 4). A compression spring 450 extends between the body portion 30 and the button 410 to urge the button in an upward direction as viewed in FIGS. 3 and 4. The activation rod 420 extends longitudinally rearwardly from the activation button 410 and is slidably mounted to the body portion 30 for relative longitudinal movement. A compression spring 460 extends between the rod 420 and the body portion 30 to urge the rod 420 forward (to the left as shown in FIGS. 3 and 4). As best shown in FIG. 4, the button 410 and rod 420 include cam surfaces 410a, 420a, respectively, that abut each other and are skewed 45 degrees relative to the axes of the button 410 and rod 420. Accordingly, downward depression of the button 410 moves the rod 420 rearwardly from a normally closed position (shown in FIG. 2) to a rearward open position.

The magnet 430 (or other magnetic material) is mounted to a rearward end of the rod 420. The metal objects 440 are disposed on inward sides of the legs 40, 50, 60. The illustrated metal objects 440 are screws, but may alternatively comprise any other ferromagnetic metal. As shown in FIG. 2, when the rod 420 is in its forward, normally closed position, the magnet 430 and metal objects 440 are aligned such that the magnet 430 tends to keep/lock the legs 40, 50, 60 in their closed positions. However, the magnetic connection can be broken by pulling a leg 40, 50, 60 away from the other legs 40, 50, 60 or body portion 30.

To open the flashlight 10 into a tripod position, the operator depresses the activation button 410, which moves the rod 420 and magnet 430 rearwardly, which moves the magnet 430 longitudinally away from the metal objects 440, thereby allowing the legs 40, 50, 60 to open under the biasing force of the spring 350. When the operator releases the button 410, the rod 420 and magnet 430 return to their forward normal positions. To close the tripod of the flashlight 10, the operator moves the legs 40, 50, 60 inwardly until the metal objects 440 magnetically connect to the magnet 430. The detent mechanism 400 remains physically mounted to the flashlight 10 regardless of whether the legs 40, 50, 60 are open or closed.

While the magnet 430 is disposed on the rod 420 and the metal objects 440 are disposed on the legs 40, 50, 60 in the illustrated embodiment, magnets could alternatively be disposed on the legs 40, 50, 60 and a metal object disposed on or defined by the rod 420 without deviating from the scope of the present invention.

While the illustrated detent mechanism 400 utilizes a magnet 430 and metal objects 440, the detent mechanism could alternatively use any other suitable fastening system. For example, hooks on the legs 40, 50, 60 could engage a corresponding surface feature at the rearward end of the rod 420 until rearward movement of the rod 420 disengages the surface feature from the legs. Moreover, any other suitable detent mechanism may be used to releasably secure the legs 40, 50, 60 in their closed positions (e.g., a rubber band wrapped around the legs 40, 50, 60). Furthermore, the flashlight 10 may omit a detent mechanism altogether without deviating from the scope of the present invention.

As shown in FIG. 3, each of the legs 40, 50, 60 includes a battery source holder 600 that includes electrical leads that are constructed and arranged to electrically connect to positive and negative leads of a battery source 610. In the illustrated flashlight 10, each battery source 610 comprises three individual cells 610a aligned in series. The illustrated cells 610a are AA cells. However, the battery source holders 600 may alternatively be shaped to accommodate any other suitable battery type. Moreover, the battery sources 610 may alternatively comprise single cells without deviating from the scope of the present invention. The battery source holders 600 are defined by tubes that are formed by the legs 40, 50, 60. The tubular legs 40, 50, 60 are shaped and sized to accommodate the battery sources 610 therein. Alternatively, the battery source holders 600 may be discrete from the legs 40, 50, 60 and subsequently mounted to the legs 40, 50, 60 via any suitable fastening mechanism.

Removable end caps 630 are screwed or otherwise fastened to the ends of the legs 40, 50, 60 to releasably secure the battery sources 610 within the battery holders 600.

The legs 40, 50, 60 preferably comprise an electrically conductive material that provides an electrical path between the front and rear of each battery source holder 600 so that additional wires need not extend over the longitudinal length of each leg 40, 50, 60.

While battery source holders 600 are disposed in each of the legs 40, 50, 60 of the illustrated flashlight 10, battery source holders may alternatively be disposed in just one or two of the legs 40, 50, 60 without deviating from the scope of the present invention.

Figure 5:
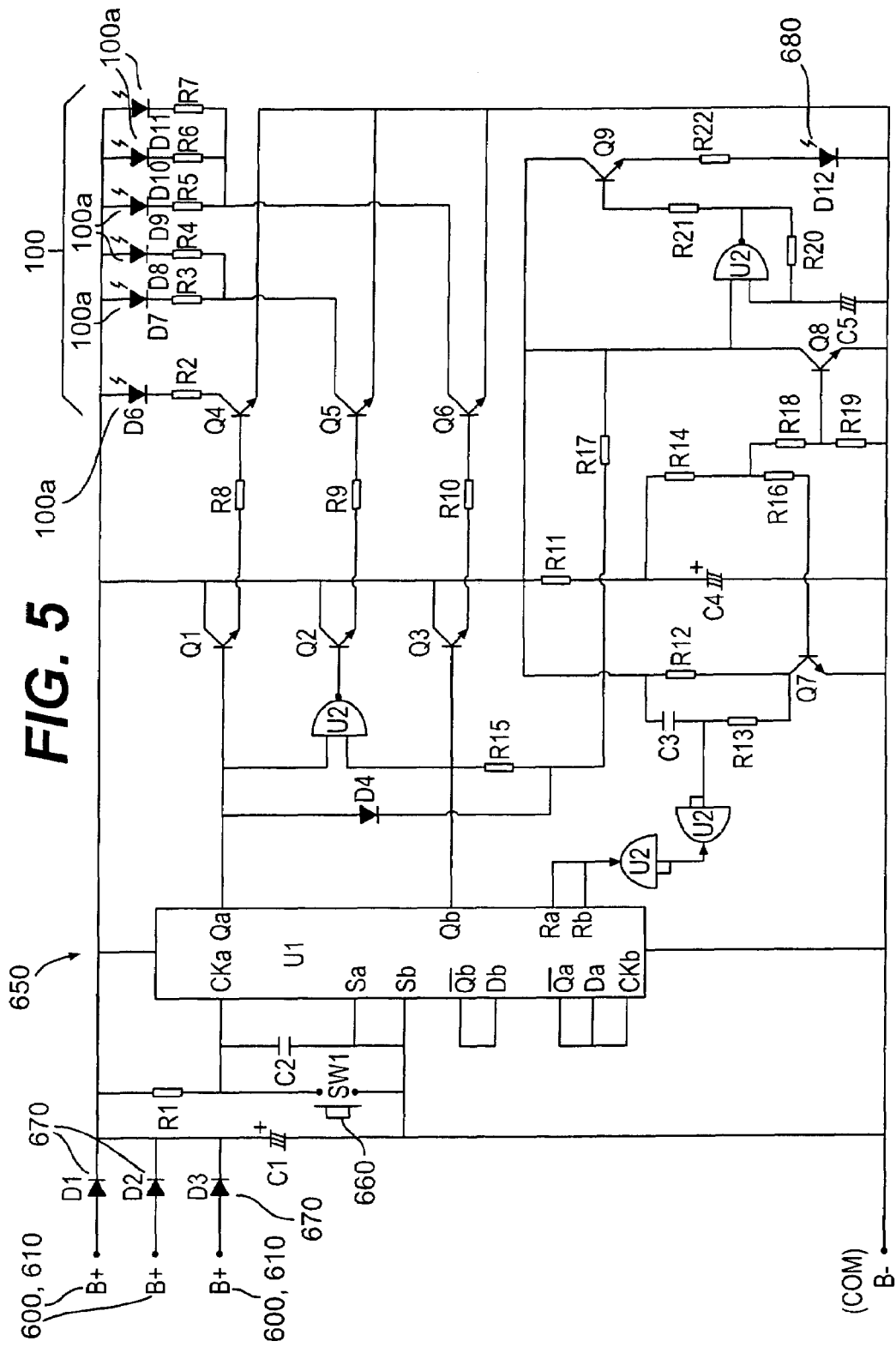
FIG. 5 is an electrical circuit diagram of the flashlight in FIG. 1.

FIG. 5 illustrates an electrical circuit 650 of the flashlight 10. As shown in FIGS. 1-5, the electrical circuit includes an on/off switch 660 for turning the flashlight 10 on and off. The illustrated switch 660 is a depressible momentary switch, but may alternatively comprise any other suitable switch. As shown in FIG. 5, the battery sources 610 and associated battery source holders 600 are connected to each other in a parallel circuit and adapted to connect to the light source 100 in parallel.

As shown in FIG. 5, a diode 670 is disposed in series with each of the battery sources 610 and battery source holders 600. The diodes 670 discourage electricity from flowing between the battery sources 610. Such electricity flow has plagued conventional parallel battery circuits because it discharges the interconnected batteries. As shown in FIG. 5, any complete electrical path between any two of the battery sources 610 comprises two oppositely biased diodes 670 in series with each other. Consequently, the battery source holders 600 and battery sources 610 remain in a closed parallel circuit with each other without discharging each other.

The parallel circuit formed between the battery source holders 600 enable the flashlight 10 to efficiently use the electricity stored in the battery sources 610. One or two of the battery source holders 600 may be left empty without reducing the light output of the light source 100. Instead, omitting a battery source(s) 610 from up to two of the battery source holders 600 will merely result in decreased flashlight battery life. The flashlight 10 may therefore be operated with one, two, or all three of the battery source holders 600 filled with battery sources 610. One or even two of the battery source holders 600 may be eliminated altogether without deviating from the scope of the present invention.

The diodes 670 also protect the battery sources 610 if one or more of the battery sources 610 are placed in the battery source holders 600 backwards (i.e., negative battery source 610 leads connected to positive battery source holder 600 leads and positive battery source 610 leads connected to negative battery source holder 600 leads). In a conventional parallel circuit, such backward alignment would create a closed series circuit between the battery sources 610 that would quickly discharge the battery sources. However, the presence of the diodes 670 prevents such current flow between such improperly connected battery sources 610.

As shown in FIG. 5, the circuit 650 provides for the selective lighting of one, three, or six of the LEDs 100*a*. Depressing the switch 660 once electrically connects the battery sources 610 to one of the LEDs 100*a* on (a first closed switch 660 position). Depressing the switch 660 a second time electrically connects the battery sources 610 to an additional two of the LEDs 100*a* (a second closed switch 660 position). Depressing the switch 660 a third time electrically connects the battery sources 610 to all six LEDs 100*a* (a third closed switch 660 position). Depressing the switch 660 a fourth time electrically disconnects the battery sources 600 from the LEDs 100*a* (i.e., an open switch 660 position).

The LEDs 100*a* are connected to each other in parallel such that the light intensity of each LED 100*a* remains constant regardless of how many of the LEDs 100*a* are electrically connected to the battery sources 610. However, connection of a greater number of LEDs 100*a* to the battery sources 610 will discharge the battery sources 610 more rapidly. Flashlight 10 battery life is maximized when all three battery sources 610 are used to light just one of the LEDs 100*a*.

As shown in FIGS. 1-5, the circuit 650 includes a low-battery-level indicating LED 680. The circuit 650 turns on the LED 680 when the battery level of the connected battery sources 610 is within 10% of being fully discharged. The LED 680 indicates to the operator that the operator may want to use just one of the six LEDs 100*a* to conserve battery source 610 life.

Figure 6:
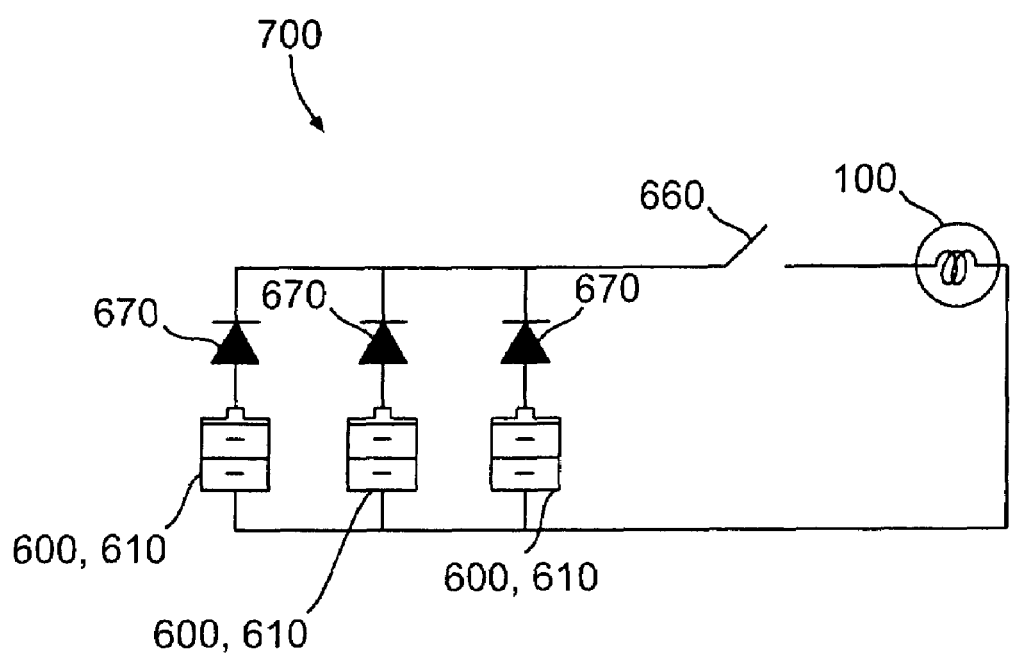
FIG. 6 is an electrical circuit diagram according to an alternative embodiment of the present invention.

FIG. 6 illustrates an electrical circuit 700 according to an alternative embodiment of the present invention. The circuit 700 may replace the circuit 650 without deviating from the scope of the present invention. In the circuit 700, the battery sources 610 (and battery source holders 600) and light source 100 are connected to each other in parallel. The on/off switch 660 is electrically disposed between the light source 100 and the battery sources 610, in series with the light source 100. The switch 660 may be a momentary switch or a two position switch. The battery sources 610 are electrically connected to the light source 100 when the switch 660 is closed (ON), and the battery sources 610 are electrically disconnected from the light source 100 when the switch 660 is in the open position (OFF). Diodes 670 are disposed in series with each of the battery sources 610 to discourage the parallel battery sources 610 from discharging each other.

FIG. 7 illustrates a flashlight 800 according to an alternative embodiment of the present invention. Because the flashlight 800 is similar to the flashlight 10, a redundant description of the redundant features is omitted.

The flashlight 800 includes a light source 810, which is mounted to a head 820. The head 820 pivotally connects to a body portion 830. Three legs 840, 850, 860 pivotally connect to the body portion 830 so that the legs 840, 850, 860 can pivot between a closed position, in which the legs 840, 850, 860 form a handle of the flashlight 800, and an open tripod position (shown in FIG. 7).

A detent mechanism 870 releasably secures the legs 840, 850, 860 in their closed positions. The detent mechanism 870 comprises a flexible cord 880, openings 890 in the base of each leg 840, 850, 860, and a clasp 900. The clasp 900 slidingly engages two spaced portions of the cord 880 so as to form a length/loop of cord 880 on one side of the clasp 900. The length of cord 880 on the one side of the clasp 900 threads sequentially through the openings 890 in the base of each of the legs 840, 850, 860. The clasp 900 releasably and selectively clamps the cord 880 to selectively vary a length/perimeter of the length of the cord 880 on the one side of the clasp 900. By reducing the length of cord 880 on the one side of the clasp 900 and clamping the clasp 900, an operator can close the legs 840, 850, 860 and secure them in the closed position such that the legs 840, 850, 860 for the flashlight's handle. By increasing the length, the operator can allow the legs 840, 850, 860 to open into their tripod position.

The flexible cord 880 comprises any suitable elongated, flexible material (e.g., rope, twine, plastic, string, ribbon, rubber, chain link, woven metal, wire, etc.).

As shown in FIG. 7, when the loop of cord 880 has its largest length, the cord 880 prevents the legs 840, 850, 860 from opening beyond their predetermined open position. The detent mechanism 880 thereby preferably secures the legs 840, 850, 860 in their open position. As in the flashlight 10, the legs 840, 850, 860 may move in unison and be spring biased toward their open position. Alternatively, the legs may freely independently pivot such that the operator, himself/herself, manually moves each leg 840, 850, 860 between its open and closed position.

One or both ends of the cord 880 connect to a key ring 910 such that the flashlight 800 and key ring 910 create a key chain. The entire flashlight 800 is preferably relatively small so that it can be conveniently used as a key chain. When the legs 840, 850, 860 are in their closed positions, the cord forms a flexible connector between the flashlight 800 and the key ring 910. While the illustrated key ring 910 connects to the cord 880, the key ring 910 may alternatively connect to any other suitable part of the flashlight 800 (e.g., the head 820, one of the legs 840, 850, 860, etc.) without deviating from the scope of the present invention.

The light source 810 comprises a single LED, but may alternatively comprise any other suitable light source (multiple LEDs, tungsten bulb, etc.). Three button cell batteries (not shown) are disposed in the head 820 and define a battery source for the flashlight 800. The battery source electrically connects to the light source 810 via an ON/OFF switch 920. Alternatively, battery source(s) (e.g., single AAA batteries) may be disposed in one, two, or three of the legs 840, 850, 860 and connect in series or in parallel to the light source 810 via the switch 920 to power the flashlight 800.

Throughout this text and appended claims, the term "generally perpendicular" is intended to mean that the referenced directions are within five degrees of perpendicular to each other (i.e., form an angle with each other of between 85 and 95 degrees).

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. A flashlight comprising:
a light source comprising a plurality of lights;
a plurality of battery sources;
a plurality of diodes, each of said plurality of diodes being disposed in series with a corresponding one of the plurality of battery sources to discourage electricity from flowing from one of the battery sources to another of the battery sources; and
a switch, wherein an actuation of the switch couples at least one of the plurality of lights in parallel with the plurality of battery sources, and a subsequent activation of the switch couples at least an additional one of the plurality of lights in parallel with the plurality of battery sources.

2. The flashlight of claim 1, wherein any complete electrical path between any two of the plurality of battery sources comprises two oppositely biased diodes in series with each other arranged to discourage current flow between said any two of the plurality of battery sources.

3. The flashlight of claim 1, wherein each of the plurality of battery sources comprises a plurality of batteries arranged in series with each other.

4. A flashlight comprising:
a housing defining a plurality of battery source holders connected in parallel with each other;
a light source mounted to the housing, said light source comprising a plurality of lights;
a plurality of diodes, each of said plurality of diodes being disposed in series with a corresponding one of the plurality of battery source holders; and
a switch, wherein an activation of the switch couples at least one of the plurality of lights in parallel with the plurality of battery source holders, and a subsequent activation of the switch couples at least an additional one of the lights in parallel with the plurality of battery source holders.

5. The flashlight of claim 4, wherein the switch comprises a depressible momentary switch.

6. The flashlight of claim 4, wherein the plurality of battery source holders remain in a closed parallel circuit with each other regardless of the position of the switch, said closed parallel circuit comprising diodes arranged to prevent electricity from flowing between any of the plurality of battery sources.

7. The flashlight of claim 1, wherein the plurality of lights comprises a plurality of light-emitting diodes.

8. The flashlight of claim 7, wherein the plurality of light-emitting diodes are arranged in at least two groups of parallel light-emitting diodes.

9. The flashlight of claim 1, wherein the switch comprises a depressible momentary switch.

10. The flashlight of claim 1, wherein an initial activation of the switch couples a single one of the plurality of lights to the plurality of battery sources, a second activation couples an additional two of the plurality of lights, and a third activation couples an additional three of the plurality of lights.

11. The flashlight of claim 10, wherein a fourth activation of the switch disconnects each of the plurality of lights from the plurality of battery sources.

12. The flashlight of claim 1, further comprising a low battery level indicating device.

13. The flashlight of claim 12, wherein the low battery level indicating device comprises a light-emitting diode.

14. The flashlight of claim 4, wherein the plurality of lights comprises a plurality of light-emitting diodes.

15. The flashlight of claim 14, wherein the plurality of light-emitting diodes are arranged in at least two groups of parallel light-emitting diodes.

16. The flashlight of claim 4, wherein the switch comprises a depressible momentary switch.

17. The flashlight of claim 4, wherein an initial activation of the switch couples a single one of the plurality of lights to the plurality of battery source holders, a second activation couples an additional two of the plurality of lights, and a third activation couples an additional three of the plurality of lights.

18. The flashlight of claim 17, wherein a fourth activation of the switch disconnects each of the plurality of lights from the plurality of battery source holders.

19. The flashlight of claim 4, further comprising a low battery level indicating device.

20. The flashlight of claim 19, wherein the low battery level indicating device comprises a light-emitting diode.

21. The flashlight of claim 4, wherein each of the plurality of battery source holders comprises a tubular leg.

* * * * *